F. P. OLDS.
TRUCK.
APPLICATION FILED JULY 2, 1908.
917,648.
Patented Apr. 6, 1909.
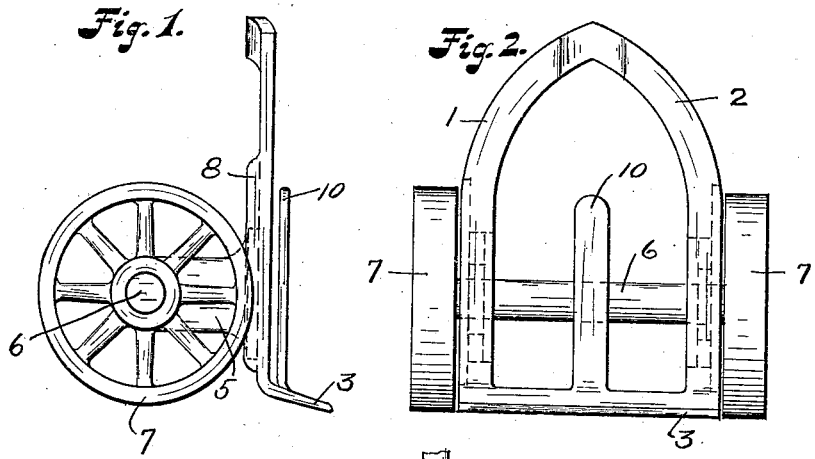

UNITED STATES PATENT OFFICE.

FREDERICK P. OLDS, OF BEREA, OHIO.

TRUCK.

No. 917,648.     Specification of Letters Patent.     Patented April 6, 1909.

Application filed July 2, 1908. Serial No. 441,659.

*To all whom it may concern:*

Be it known that I, FREDERICK P. OLDS, a citizen of the United States of America, residing at Berea, in the county of Cuyahoga and State of Ohio, have invented certain new and useful Improvements in Trucks; and I hereby declare the following to be a full, clear, and exact description of the invention, such as will enable others skilled in the art to which it pertains to make and use the same.

This invention relates to improvements in trucks.

The object of this invention is to provide a truck for handling articles of merchandise, such as barrels, bags and the like, which will be strong, which can be cheaply manufactured and which will be compact in size so that it will occupy but a small space.

My invention, therefore, consists in the features of construction and combination of parts hereinafter described in the specification, pointed out in the claims and illustrated in the accompanying drawings.

In general it may be said that the truck comprises simply a frame mounted upon a pair of wheels, but without any handle which is entirely omitted in order that the truck may be stored under a counter, shelf or in some other small space, and means is provided on the frame for engaging the blade or pan of a shovel so that the handle of the shovel will serve as the handle of the truck.

Referring to the drawings Figure 1 is a side elevation of a truck embodying my invention. Fig. 2 is a front elevation of the same. Fig. 3 is a perspective view of the same with a shovel operatively mounted thereon so that the handle of the shovel serves as the handle or means for propelling the truck.

By referring to the drawings it will be seen that the body of the truck consists of an open frame which is curved or arched at the top and comprises side pieces 1 and 2 and a bottom cross piece 3, all of which are formed integral. The frame may be made of any suitable material but, preferably of wrought iron or may be stamped from sheet metal. The cross piece 3 is arranged at an angle to the rest of the frame to form the usual flange or toe piece which is inserted under the object which is to be carried on the truck. On the bottom of the frame at each side are formed lugs 5 in which is journaled an axle 6 and thereon are mounted small wheels 7. At each side of the frame is formed a downwardly extending flange 8 which constitutes a reinforcement for the frame. Near the center of the toe piece is arranged an upwardly extending resilient tongue 10 which is arranged parallel with the frame but slightly in advance thereof so as to permit of the insertion of the blade or pan of a shovel between the frame and the tongue.

When it is desired to use the truck the blade or pan of an ordinary spade or shovel is inserted between the frame portion and the tongue 6 and the resiliency of the tongue securely clamps the frame to the shovel so that the truck can be drawn or shoved about the same as an ordinary truck, using the shovel handle as the handle of the truck. When the truck is not in use the shovel is withdrawn from the frame and owing to the compact size of the truck it can be readily stored away in a small space.

What I claim is:—

1. A truck comprising a frame, wheels operatively mounted on said frame and a tongue arranged on said frame and adapted to engage and clamp a shovel blade or the like inserted between the frame and the tongue.

2. A truck comprising a frame, wheels operatively mounted on said frame and a tongue arranged on said frame and extending parallel with but in a different plane from said frame.

3. A truck comprising a frame, wheels operatively mounted on said frame, strengthening ribs arranged at each side of said frame and a resilient tongue arranged on said frame and spaced a distance therefrom to permit the insertion of the blade of a shovel or the like between the frame and said tongue.

4. A truck comprising an inverted U-shaped frame provided with a toe-piece, a tongue formed on said toe-piece and extending upwardly but at a distance from said frame and wheels operatively mounted on said frame.

5. A truck comprising an open frame having a toe-piece arranged at an angle thereto, means for reinforcing said frame, a resilient tongue extending upwardly from said toe-piece and wheels operatively mounted on said frame.

In testimony whereof, I sign the foregoing specification, in the presence of two witnesses.

FREDERICK P. OLDS.

Witnesses:
VICTOR C. LYNCH,
N. L. McDONNELL.